(12) United States Patent
McKnight et al.

(10) Patent No.: US 7,678,440 B1
(45) Date of Patent: Mar. 16, 2010

(54) DEFORMABLE VARIABLE-STIFFNESS CELLULAR STRUCTURES

(76) Inventors: Geoffrey P. McKnight, 11608 Francis Pl., Los Angeles, CA (US) 90055; Christopher P. Henry, 60 Westbury St., Thousand Oaks, CA (US) 91360

( * ) Notice: Subject to any disclaimer, the term of this patent is extended or adjusted under 35 U.S.C. 154(b) by 128 days.

(21) Appl. No.: 11/713,560

(22) Filed: Mar. 1, 2007

Related U.S. Application Data

(60) Provisional application No. 60/778,245, filed on Mar. 1, 2006.

(51) Int. Cl.
  *B32B 3/12* (2006.01)
  *B32B 3/26* (2006.01)
  *C22F 3/00* (2006.01)
  *B28B 1/00* (2006.01)

(52) U.S. Cl. .................. 428/116; 428/913; 428/327; 428/304.4; 257/415; 148/563; 264/630; 264/629

(58) Field of Classification Search .............. 428/116, 428/117, 118, 119, 913, 327, 307.5, 192, 428/58; 257/415; 310/300; 264/177.12, 264/630; 148/563
See application file for complete search history.

(56) References Cited

U.S. PATENT DOCUMENTS

| | | | | |
|---|---|---|---|---|
| 4,061,812 A * | 12/1977 | Gilwee et al. | ............... | 428/117 |
| 5,395,390 A * | 3/1995 | Simon et al. | ............... | 623/1.18 |
| 6,106,548 A * | 8/2000 | Roubin et al. | .............. | 623/1.15 |
| 6,182,929 B1 * | 2/2001 | Martin et al. | ............... | 244/219 |
| 6,244,638 B1 * | 6/2001 | Kuczynski et al. | .......... | 293/109 |
| 6,664,702 B2 * | 12/2003 | Soroushian | ................ | 310/246 |
| 6,969,548 B1 * | 11/2005 | Goldfine | .................... | 428/159 |
| 2005/0049690 A1 * | 3/2005 | Boismier et al. | ........... | 623/1.18 |
| 2005/0287371 A1 * | 12/2005 | Chaudhari et al. | .......... | 428/412 |
| 2006/0202492 A1 * | 9/2006 | Barvosa-Carter et al. | .... | 293/107 |

OTHER PUBLICATIONS

Gibson, L.J. and Ashby, M.F., Cellular Solids: Structure and Properties, 2nd Ed., Cambridge University Press, 1997; pp. 93-158.

T.T. Chi, et al., "Multi-Axial Multi-ply carbon fabric reinforced epoxy composites: Mechanical properties and investigation of initial damage," Katholieke Universiteit Leuven, Belgium, Department of Metallurgy and Materials Engineering, Composite Materials Group, pp. 1-10.

(Continued)

*Primary Examiner*—David R Sample
*Assistant Examiner*—Nicole T Gugliotta
(74) *Attorney, Agent, or Firm*—Tope-McKay & Assoc.

(57) ABSTRACT

Described is a deformable, variable-stiffness cellular structure. The cellular structure a group of unit cells with each unit cell having a cellular geometry. The group of unit cells are formed of a variable-stiffness composite material (VSM). The VSM has a first stiffness state and a second stiffness state. Additionally, the cellular structure has a first shape and a second shape, with a gradation of shapes between the first shape and second shape. The transition from the first shape to the second shape occurs through using an actuation signal to actuate the VSM to change the stiffness of the cellular structure, thereby allowing the cellular structure to be deformed from the first shape to the second shape, and any shape therebetween. The cellular structure can be locked in the second shape through actuating the VSM from the second stiffness state to the first stiffness state.

31 Claims, 13 Drawing Sheets

OTHER PUBLICATIONS

Gibson, L.J. And Ashby, M.F., Cellular Solids: Structure and Properties, 2nd Ed., Cambridge University Press, 1997.

Warren, W.E. And Kraynik, A.M., "Foam Mechanics: the linear elastic response of two-dimensional spatially periodic cellular materials," Mech. Mater., 1987, 6:27.

Masters, I.G. and Evans, K.E., "Models of the elastic deformation of honeycombs," Composite Stuctures, 35 (1996) 403-422.

Wan, H., H Ohtaki, S. Kotosaka, G. Hu, "A study of negative Poisson's ratios in auxetic honeycombs based on a large deflection model," European Journal of Mechanics A/Solids 23 (2004) 95-106.

Frank Ko, "From Textile to Geotextiles," Seminar in Honor of Professor Robert Koerner, Sep. 13, 2004, Department of Materials Science and Engineering, Drexel University.

Wicks, N. and Hutchinson J.W., "Sandwich Plates Actuated by a Kagome Planar Truss," Journal of Applied Mechanics, 2004, vol. 71, pp. 652-662.

Evans AG. "Multifunctionality of cellular metal systems." Prog. Mater. Sci. 1999, 43:171.

Evans AG. "Lightweight materials and structures," MRS Bulletin 2001, (October):790.

Wadley HNG, Fleck NA, Evans AG. "Fabrication and structural performance of periodic cellular metal sandwich structures," Composite Science and Technology, 2003; 63:2331.

* cited by examiner

US 7,678,440 B1

DEFORMABLE VARIABLE-STIFFNESS CELLULAR STRUCTURES

PRIORITY CLAIM

The present application claims the benefit of U.S. Provisional Application No. 60/778,245, filed Mar. 1, 2006, the present application is also a continuation-in-part of prior application Ser. No. 11/051,758, filed Feb. 3, 2005 and prior application Ser. No. 11/193,148, filed Jul. 29, 2005.

STATEMENT OF GOVERNMENT INTEREST

This invention was made with U.S. Government support under Contract No. FA8650-05-C-7215. The U.S. Government may have certain rights in this invention.

BACKGROUND OF INVENTION

The field of smart materials and intelligent structures has been gradually developing over the past few decades, increasingly enabled by technological advances in the areas of sensors, engineering materials, and actuators. The basis of many actuator and sensor technologies has increasingly been found in emerging "active materials." Active materials, as a category, are materials that change their shape in response to an external control stimulus, typically a field, such as a thermal, magnetic, or electric field, but also radiation (light) or a changing chemical environment. Materials in this broad category include several classes, often delineated by the stimulus and material type: shape memory alloys, (SMAs), shape memory polymers (SMPs), piezoelectric ceramics, magnetostrictives, and electroactive polymers. Within each of these classes, there are many materials; e.g., within electroactive polymers alone there are a wide variety of low- and high-voltage-activated materials with widely-varying properties, such as ionic-polymer metal composites, conductive polymers, gels, and others.

Additionally, deployable and/or deformable structures have been obtained using active materials incorporated with linear elastic materials. However, a significant change in shape and form of the structural component is hampered by the sub-optimal use of linear elastic materials. Conventional design methodologies using linear elastic materials are an inappropriate choice for large structural shape changes. In one case, the structural components can be designed such that stiffness and strength are low, but the overall reversible deformation is large. In another approach the structure may be designed such that the system exhibits high stiffness, but as a result the reversible deformation capability of the structure is limited. In this case large amounts of energy are required to affect a change in the geometry, along with a significant support structure to maintain the deformation. In addition, high stiffness materials cannot be made to produce significant "Gaussian Curvature" or simultaneous curvature about two orthogonal axes because this requires a change in area in the plane of the deformation. The Poisson effect severely limits the ability of linear elastic materials to change area.

The capability for structural components to achieve large changes in shape would be greatly enabled by materials that can reversibly change their elastic stiffness. By changing elastic stiffness, the energy required for deformation can be decreased. Further advantages would result from a material, which in a lowered stiffness state could undergo large reversible deformation in at least one direction. Given these properties, it would be possible to consider making large changes in the shape of high-stiffness structural components. While this property is currently available using polymers, especially shape memory polymers, these materials used in their bulk form are difficult to control, and building up thick sections for adequate bending stiffness results in slow responding structures.

Current structure design using static component shapes often requires a compromise between various operational conditions rather than optimization over a range of conditions. If an intermittent change in structure is required, for example in the stowing or deploying of a structure, reconfiguring of an aircraft wing from a take-off or landing configuration to a cruising configuration, current solutions require extra components and added complexity is incurred. This problem is not limited to aerospace but is common to a myriad of technologies, such as for example automotive, space, telecommunications, medical, optical, or other technologies where structural or surface reconfiguration is desirable.

Other important areas where a change in stiffness is desirable include storage and deployment of expandable structures. Current methods rely heavily on complicated assemblies of rigid parts that make use of traditional mechanical components (pivots, latches, etc. . . . ). Deployable devices using variable-stiffness structures would enable new designs to be considered, with fewer parts and assembles, thus reducing weight and complexity.

U.S. Pat. No. 6,000,660 by Griffin et al., herein incorporated by reference, describes a variable-stiffness member which changes its stiffness by rotating an elliptical shaft, thereby changing the bending stiffness according to the change in height and width of the elliptical cross section. This concept is limited in the total change in stiffness achievable, and it is not nearly as robust as a material that exhibits intrinsic change in stiffness. In addition, this approach is not applicable to creating stiffness changes or structural shape changes in large planar surface components.

Fibrous elastic memory composite materials utilizing carbon fibers and a shape memory polymer matrix can change their elastic stiffness. Details of this approach are outlined by Campbell and Maji, in the publication "Deployment precision and mechanics of Elastic Memory Composites," presented at the 44$^{th}$ Structures, Structural Dynamics, and Materials Conference, AIAA, Norfolk, Va., 2003. The limitation of these materials comes from the use of fibers as the reinforcement agent, which undergo micro buckling in order to achieve high compressive strain. The mechanical properties of the composite material once microbuckling has been initiated are significantly reduced as compared to the initial aligned fiber direction. In addition the process of microbuckling can be difficult to control in terms of the direction of microbuckling (i.e. in-plane or out of plane). Another important limitation of these materials in the case of deforming surfaces is a limitation in the amount of area change (simultaneous strain in two orthogonal directions) that can be achieved due to the inextensibility and length of the reinforcing fibers.

Another approach intended to serve the same role as these materials in the specific case of morphing structures are termed compliant structures. These structures employ a specific architecture that tailors deflection along a desired contour when subject to known input forces and deflections. While this approach is advantageous in some applications, it is generally limited in the number of configuration states that can be achieved and optimized. Therefore, it is not as effective when more than one pre-specified range of motion is desired.

In some applications what is needed is a structure capable of changing bending stiffness in response to a control signal such that the stiffness may be decreased, the material reshaped, and the stiffness returned after reshaping. Therefore, a continuing need exists for a cellular structure that allows a change in material stiffness to permit a change in the shape of the cellular structure.

SUMMARY OF INVENTION

The present invention relates to a deformable, variable-stiffness cellular structure. The structure comprises a group of unit cells with each unit cell having a cellular geometry. The group of unit cells are formed of a variable-stiffness composite material (VSM). The VSM has a first stiffness state and a second stiffness state and the cellular structure has a first shape and a second shape, with a gradation of shapes there between. The transition from the first shape to the second shape occurs by applying a stiffness changing field (for shape memory polymer-based VSM this is a temperature field) permitting the cellular VSM structure to change from the first stiffness state to the second stiffness state. With an actuation signal that applies a force or displacement to the cellular structure to be deformed from the first shape to the second shape, and any shape there between.

Once in the second shape, the cellular structure can be locked in the second shape by removing the stiffness-changing field so that the VSM may return from the second stiffness state to the first stiffness state.

In another aspect, each cell has a plurality of edges and the cellular structure is deformed from the first shape to the second shape using an external deformation system. The external deformation system is an actuator selected from a group consisting of a linear or rotary actuator. The actuator can be used to apply displacement to the edges or at various locations within the cellular structure to change the shape of the cellular structure. The actuator is selected from a group consisting of an electromagnetic motor, a hydraulic cylinder, a pneumatic cylinder, and an ultrasonic piezoelectric motor. A pad can be used to connect the actuator to the cellular structure to distribute force provided by the actuator over a larger area of the cellular structure.

In another aspect, the cellular structure is configured to have a ratio selected from a group consisting of a negative Poisson ratio and a positive Poisson ratio.

In yet another aspect, at least one cell in the cellular structure includes a strain relief, thereby allowing the cell to accommodate global tensile stretching through cell wall bending.

Furthermore, each cell in the cellular structure has a cell wall having a gradation in stiffness property, such that in inner material includes a material having a constant stiffness, and an outer material includes a variable-stiffness material. Out-of-plane loads are carried by the inner material and in-plane loads are carried by the variable-stiffness material on the outer material.

In another aspect, the constant stiffness material is a material selected from a group consisting of steel alloys, aluminum alloys, titanium alloys, glass fiber reinforced polymer, carbon fiber reinforced polymer, polymer fiber reinforced polymer, high stiffness structural polymers, silicone, a metal, a fiber composite, a polymer, a ceramic, and a semiconductor.

In another aspect, each cell has a cavity and the cavity is filled with a volume changeable elastic material to assist strain and shape recovery.

Additionally, the elastic material is elastic foam, such as a polymeric foam.

Furthermore, each cell has a wall thickness and the wall thickness is between $1/1000$ and $1/5$ of a cell length In another aspect, the morphing cellular structure has a size and each unit cell in the morphing cellular structure is between approximately one thousandths and one third of the size of the morphing cellular structure.

The cellular structure has an external surface and further comprises a solid outer skin covering the external surface. The skin covering is a material selected from a group consisting of an elastic material which is adhesively bonded to the cell structure, a stretchable fabric material, a thin shape memory polymer, and a VSM. This configuration can be used to create a "sandwich structure" with significantly improved bending stiffness over the cellular structure alone.

In another aspect, the skin covering stores elastic energy during transformation so that strain and shape recovery is assisted.

In yet another aspect, the wall thickness is varied to change deformation properties to control the local strain (within each wall) and/or global strain of the whole cell structure. This approach can be used to induce desired buckling modes to cell and control its deformation.

Furthermore, the cellular structure is configured to be deformed by softening the VSM, actuating an actuator using an actuator signal to induce deformation, hardening the VSM, and then releasing the actuator signal.

Additionally, the cellular structure is configured to change from the first shape to the second shape through an actuation process of directly applying loads to the VSM of the cell wall. This can be accomplished by incorporating an active material into at least one cell in the cellular structure. The active material is responsive to a second actuation signal such that when the VSM is in the second stiffness state, the second actuation signal can be actuated to cause the VSM to deform from the first shape to the second shape. While maintaining the second active materials' deformation, the cellular structure can be returned to the first stiffness state and the deformation locked in. Suitable materials for the active material component include those which can be forced to strain with an input signal, include shape memory alloys, piezoelectric and ferroelectric materials, electro-active polymers including conducting polymers, ionic polymer metal composite (IPMC), and dielectric elastomers, and magnetostrictive materials such as Terfenol-D and Galfenol. The incorporation of these materials must be accomplished so that the type of deformation and magnitude of deformation required work in agreement with the cellular material.

In another aspect, each cell has a cellular geometry and the cellular geometry is selected from a group consisting of plane symmetry groups including rectangular, rhombic, hexagonal, etc.

In yet another aspect, the actuation signal is a signal selected from a group consisting of a temperature change, redox reaction, pH change, electromagnetic field, chemical reaction, electric current, electric field, and magnetic field.

In another aspect, an active material is attached with the VSM at a hinge joint such that actuation of the active material forces a bending moment at the hinge joint. Additionally, the hinge joint may selectively control which truss members extending from a cellular node are permitted to undergo large angular displacements when portions of the VSM hinge joint selectively undergo a change in stiffness (i.e., softened to low stiffness). This provides for tailored levels of local load transmission and deformation accommodation within and between the cellular unit cell.

In yet another aspect, the active component of the VSM is a material selected from a group consisting of shape memory polymers, shape memory alloys, phase changing metals, wax, ice, plastically deforming materials, electrorheological fluids, magnetorheological fluids, electrostrictive materials, piezoelectrictrics materials, magnetostrictive materials, ferromagnetic magnetostrictive materials, magnetorheological elastomers, electrorheological elastomers, and liquid crystal elastomers.

In another aspect, the present invention comprises a group of unit cells with each unit cell having a cavity and a surrounding cellular geometry. The cavity of each unit cell is formed of a variable-stiffness material (VSM). An elastic material with higher stiffness surrounds the cavity to form the surrounding cellular geometry. The VSM has a first stiffness state and a second stiffness state and the cellular structure has a first shape and a second shape, with a gradation of shapes between the first shape and second shape. The transition from the first shape to the second shape occurs through using an actuation signal to actuate the VSM cavity from the first stiffness state to the second stiffness state to change the stiffness of the cellular structure, thereby allowing the cellular structure to be deformed from the first shape to the second shape, and any shape therebetween. Therefore, the stiffness of the cavity provides the stiffness to the cellular structure. The cell walls are composed of elastic materials and provide stiffness and also aid in returning the shape to the original configuration by releasing their stored elastic energy.

It can be appreciated by one skilled in the art that the present invention is not limited to the cellular structure described herein, but also includes a method for forming and configuring the same.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1A:
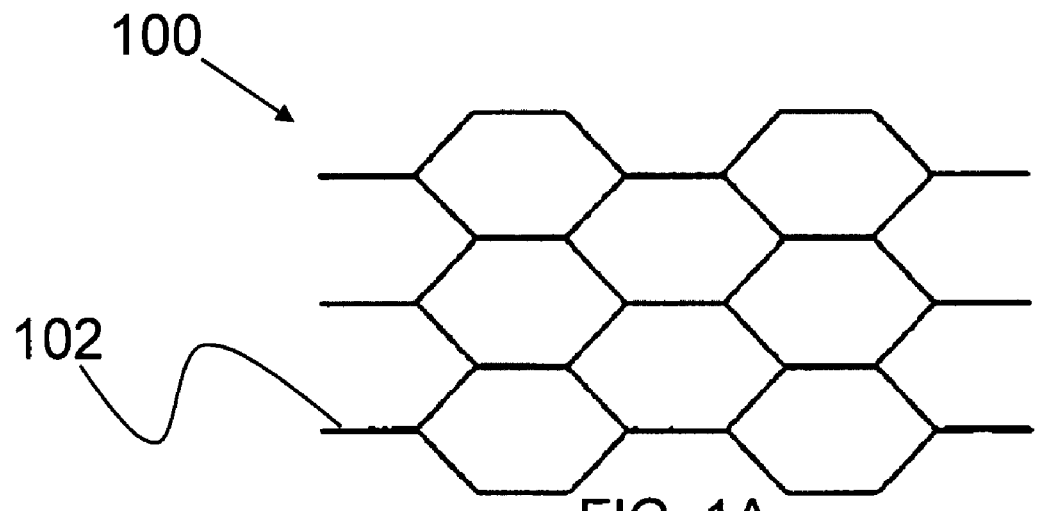
FIG. 1A illustrates a cellular structure in an expanded shape.

The present invention relates to a morphing cellular structure that includes a variable-stiffness material (VSM) that responds to external stimuli to change its stiffness state. More specifically, the present invention relates to deformable variable-stiffness cellular structure that can be deformed to a desired shape after varying the stiffness of the VSM, with the cellular structure thereafter being lockable in the desired shape by increasing the stiffness of the VSM.

The following description, taken in conjunction with the referenced drawings and/or tables, is presented to enable one of ordinary skill in the art to make and use the invention. Various modifications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated qualitatively and without any specific scale, and are intended to generally present the concept of the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

In order to provide a working frame of reference, first a glossary of terms used in the description and claims is provided. Second, an introduction is provided to give the reader a brief understanding of the present invention. Third, a discussion of various aspects of the present invention is provided to give an understanding of the specific details.

(1) Glossary

Before describing the specific details of the present invention, a centralized location is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more clearly explaining the terms used.

Activation Mechanism—The term "activation mechanism" refers to a mechanism or technique for transferring an actuation signal to a cell or group of cells. Non-limiting examples of actuation mechanisms include the use of a conductor such as metallic wires, chemicals, heat conducting materials, a magnetic field, and an environment.

Active Material—The term "active material," also known as a smart material, refers to a material that changes its shape or stiffness in response to an external control stimulus, or actuation signal.

Cellular—The term "cellular" refers to a shape that consists of or contains a cell or cells. The unit cell is repeated throughout space to create the cellular geometry, and ultimately the cellular structure.

Cellular Structure—The term "cellular structure" refers to a structure that comprises or contains a cell or cells and that includes at least one variable-stiffness material (VSM) therein. The VSM has a first stiffness state and a second stiffness state and is responsive to an actuation signal to change the VSM from the first stiffness state to the second stiffness state. When in a decreased stiffness stated, the cellular structure can be deformed to alter its shape. The cellular structure may be comprised of a single VSM, a VSM with an active material, or may be comprised of multiple active, passive, and variable-stiffness materials having either the same or different material combinations and either the same or different geometries.

Passive Material—The term "passive material" refers to an inert material that resists changing its shape in response to an external control stimulus. Passive materials may be used as structural members of the cellular structure, and cannot be deliberately changed in shape with a control signal.

(2) Introduction

The present invention comprises a deformable, variable-stiffness cellular structure using at least one variable-stiffness material. The present invention expands upon prior conceptions by combining the anisotropic properties, variable-stiffness and deformation control described in U.S. patent application Ser. No. 11/051,758, with that of single phase cellular core materials, described in U.S. patent application Ser. No. 11/193,148. Both U.S. patent application Ser. No. 11/051,758 and 11/193,148 are incorporated by reference as though fully set forth herein. The combination provides for elastic, variable-stiffness-enabled, bending to achieve large area change and large strain materials with overall variable-stiffness properties. An innovation of the present invention is the creation of unique cell geometries which effectively use the large reversible bending strain of variable-stiffness materials to create new materials which can accommodate large reversible extension and area change deformations, and have relatively large stiffness in the hard state. Further innovations include designs which have more bending rigidity than is possible using membrane type materials while still permitting large strain deformations. This is useful in surface deformation applications where smooth spline contours are desired.

The present invention describes a new method for producing high deformation materials with controllable stiffness properties and in some embodiments, a built-in deformation locking mechanism. These materials may be useful where large deformation is desired, but where large energy input is undesirable. This contrasts with existing materials where the amount of energy required to achieve a deformation is proportional to the deformation and cannot be actively altered. Existing high strain materials with fixed elastic properties include solid high extension materials such as elastomers, or porous materials such as foams.

The present invention is useful in a variety of design situations where one would like to construct a system with several large geometric changes in the shape and configuration of the system. For example, the present invention can be utilized in a compactable deployable structure that is suitable for transport and storage, and then is capable of deploying in a working configuration. While deployable structures exist, the variable-stiffness materials (VSMs) provide a more robust approach by eliminating many linkages and pivots necessary in typical mechanistic solutions.

The present invention can utilize VSMs that on their own have limited strain and area change characteristics to create porous cellular structures which can accommodate much larger changes in area and extensional strains. Essentially, the present invention can transform inextensible materials into largely extensible materials. Many materials or material systems with interesting deformation and stiffness properties are essentially inextensible but still exhibit unusual bending properties. The present invention describes how to broaden the available material property space of these materials to increase their utility. Materials which provide both bending and extensional deformation can also be used in the present invention. Specialized cellular geometries can be designed to take advantage of these properties.

The cellular structure combined with the VSM can be configured for a variety of applications. The following discussion describes the present invention in further detail, including a discussion of various embodiments.

(3) Discussion

A notable feature of the present invention is the configuration of a variable stiff material (VSM) into unit cells having a cellular geometry. As can be appreciated by one skilled in the art, the cellular structure is constructed from repeated translations of a unit cell geometry from one or more of the 17 planar symmetry groups (the 17 planar symmetry groups are commonly known in the art and easily found in the literature). These planar symmetry groups are comprised of combinations of rotations, reflections, and glide reflections. Even three-dimensional symmetries may be envisioned to tailor bending stiffness. As can be appreciated by one skilled in the art, the cellular structure can be formed from one or more unit cell geometries spatially, in plane, and through the thickness of the cellular structure.

Although the cells are described as two dimensional (2-D) structures, the cells can be extruded to form a three-dimensional (3-D) structure. As such, the morphing cellular structure can be configured in a cellular shape having 3-D deformation properties.

Figure 1B:
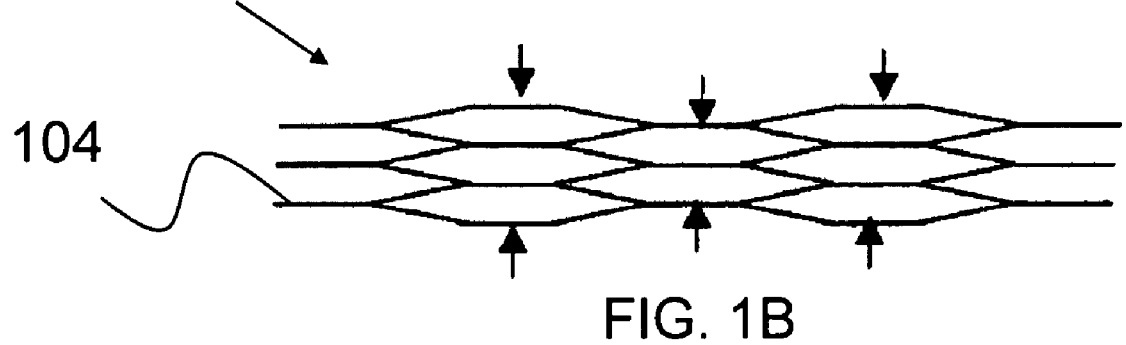
FIG. 1B illustrates the cellular structure in a collapsed shape.
Figure 1C:
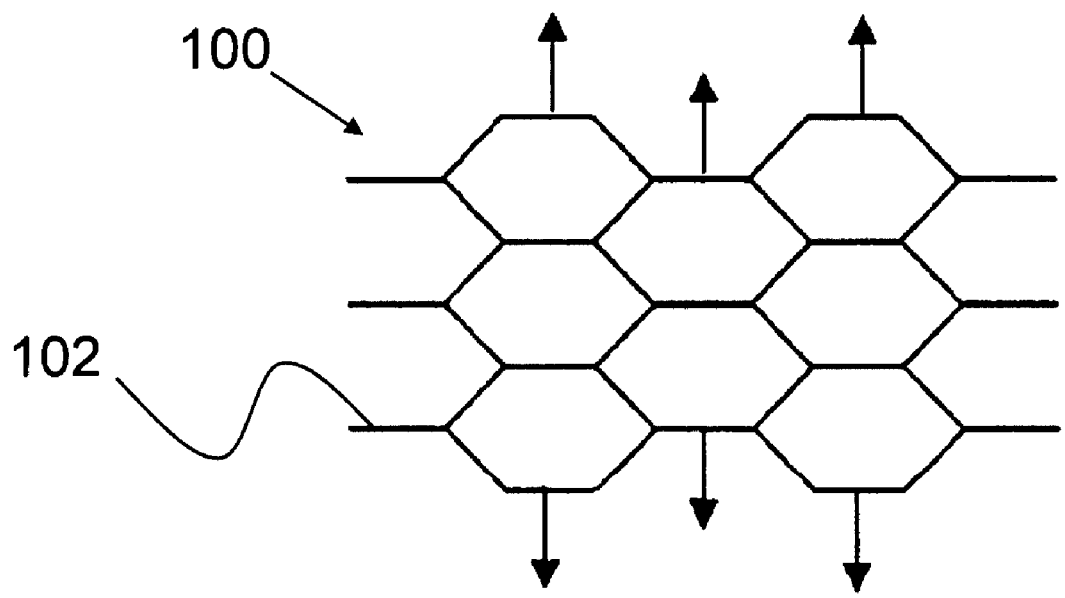
FIG. 1C illustrates the cellular structure in an expanded shape.

As shown in FIGS. 1A, 1B, and 1C respectively, the cellular structure 100 has a first shape 102 (e.g., expanded) and a second shape 104 (e.g., contracted), with a gradation of shapes therebetween. The cellular structure 100 comprises a group of unit cells with each unit cell configured to have a cellular geometry. As can be appreciated by one skilled in the art, the cellular structure 100 can be formed with the cellular structure 100 being deformable between numerous shapes, non-limiting examples of which include being deformable from a first shape 102 to a second shape 104; being deformable from both a first shape 102 to a second shape 104 and from a second shape 104 to a first shape 102; and being deformable between a plurality of shapes.

The walls of the unit cells are formed of a VSM. The VSM can be composed of both a mechanical switch material (e.g., active material) and discrete stiff material elements (e.g., fibrous material such as carbon or glass fiber, or platelet materials of metallic alloys, or other stiff material). The current state-of-the-art for mechanical switch materials is shape memory polymers (SMP); however, other technology may supplant SMP in the future, such as variable friction driven by ultrasonics, or reversible adhesion mechanisms. The cellular geometry is optimized for one or a combination of mechanical properties (e.g., large strain and area change capability, constant stiffness over large strains, low in-plane stiffness, large out-of-plane stiffness, zero Poisson's ratio, synclastic bending behavior, and other desirable attributes).

The variable-stiffness cellular structure 100 is a structure whose elastic stiffness in bending and/or axial/compression loading may be adjusted when required by applying, exposing it to, or otherwise subjecting it to an actuation signal having appropriate control conditions (e.g., thermal, electrical, magnetic, chemical, electromagnetic, etc.).

The VSM may include materials controlled thermally, electrically, magnetically, chemically, and/or electromagnetically. Non-limiting examples of thermally controlled materials include shape memory polymers and shape memory alloys. A related class of thermal materials which change stiffness in association with a change in the phase of the material include solid-liquid phase change materials. Non-limiting examples of such phase change materials include metals and metal alloys, polymers, wax, water, etc. Non-limiting examples of materials which undergo a change in stiffness associated with the application of an electrical field include ferroelectric materials, electrostrictive polymers, and electro-rheological fluids. Non-limiting examples of materials which undergo a change in stiffness associated with the application of a magnetic field include magnetostrictive materials, ferromagnetic shape memory alloys, and magnetorheological materials.

Following is a description of the shape fixity functionality of the variable-stiffness cellular structure 100 when using a shape memory polymer as the VSM. First, the structure 100 is deformed with its temperature above the transition temperature by bending the variable-stiffness cellular structure 100. Second, the structure is cooled below the transition temperature while constrained in the new shape so that the new shape is retained after cooling, without requiring the application of retaining forces. This is due to the intrinsic shape fixity of the shape memory polymer. This functionality is important to applications requiring semi-permanent shape change, such as structural morphing. While this example has been given using shape memory polymer as the VSM, similar functionality could be obtained using phase changing materials such as wax and low melting temperature metal alloys.

Material selection and cellular design leads to several different embodiments, with different effective properties in terms of total deformation, response speed, and total change in modulus. Thus, material selection will depend in part upon the particular application.

Depending on the specific application, however, other considerations may influence selection of the VSM. If response time is important, a magnetostrictive material, or a piezoelectric material may be employed to supply a rapid change in modulus on the order of fractions of milliseconds. A single crystal piezoelectric, for example, may provide the desired response time with an acceptable change in modulus for some applications.

In contrast, a shape memory polymer material requiring thermal stimulation will have response times on the order of seconds to minutes and may require significantly larger amounts of energy to obtain the change in stiffness. New shape memory polymers using light activation to change stiffness have been demonstrated that may provide reduced activation energy requirements.

In some embodiments, another attribute of the VSM could be to supply a zero power hold capability to the cellular structure utilizing the VSM. This would require the VSM to have sufficient stiffness in the zero power state to resist any strain energy built up in any constant stiffness material layers or other elastic components. This attribute is important in some deformable surface/structure embodiments where power consumption is a concern. In such embodiments, much of the benefit could be lost if continuous power is required to maintain a given state. A shape memory polymer has been successful in performing this action.

In certain embodiments, the VSM may include electrorheological fluids, which change modulus in response to an electric field. Similarly, in some embodiments the VSM may include magnetorheological fluids, which change modulus in response to a magnetic field.

Additionally, many different VSM are possible. An example of a shape memory alloy is NiTi, which exhibits a large change in modulus (about 3 times, 15-65 Giga-Pascals (GPa)) as a function of temperature.

A thermoplastic polymer will change modulus when heated to its glass transition temperature. Thus, in some embodiments, utilization of some forms of thermoplastic polymers is possible (e.g., nylon, polyurethane, etc.). In general, shape memory polymers regain shape so they may perform better in some embodiments. One possible shape memory polymer is polyurethane MM5510, produced by Mitsubishi Heavy Industries, located in Nagoya, Japan. An example of a piezoelectric is PZT 5H from TRS Ceramics Inc., located in State College, Pa. (found at www.trsceramics.com), or from PI (Physik Insturmente), of Auburn, Mass. (found at www.physikinstrumente.de). One possible electrostrictive polymer is PVDF, available from Goodfellow, located in Devon, Pa. An irradiated electrostrictive polymer such as P(VDF-TrFE), was developed by Zhang, et al. from Pennsylvania State University, which was described in Feng Xia, Z.-Y. Cheng, Haisheng Xu, and Q. M. Zhang, G. Kavarnos, R. Ting, G. Abdul-Sedat, K. D. Belfield. High Electromechanical Responses in Terpolymer of Poly(vinylidene fluoride-trifluoroethylene-chlorofluoroethylene), Adv. Maters. 14, 1574 (2002). An example of a magnetostrictive material is $Tb_xDy_{(1-x)}Fe_{1.9\to 2.1}$, which is available as TERFENOL-D from Etrema Products, located in Ames, Iowa. Another possible magnetostrictive material is FeGa, available as GALFENOL. GALFENOL is also available from Etrema Products. As can be appreciated by one skilled in the art, other VSM are possible.

The use of cellular mechanisms for ultra-large deformation, variable-stiffness materials has generated several benefits. First, cellular materials provide a potential for very large deformation due to the "free space" in the structure. Deformation in cellular structures is generally based solely on bending deformation in cell walls and hinging of hub areas. Cell wall extension may be largely ignored. This effect, combined with the relatively thin walls of the cells, drives down the effective stiffness of the materials between two to three orders of magnitude below the properties of the cell walls themselves. However, this same property permits large effective stretching, using materials for the cell walls that themselves do not permit any type of stretching, such as continuous fiber composites with SMP matrices. This allows the use of a wide variety of deformation mechanisms to create "meta" materials with very unique stiffness and deformation properties.

Figure 2:
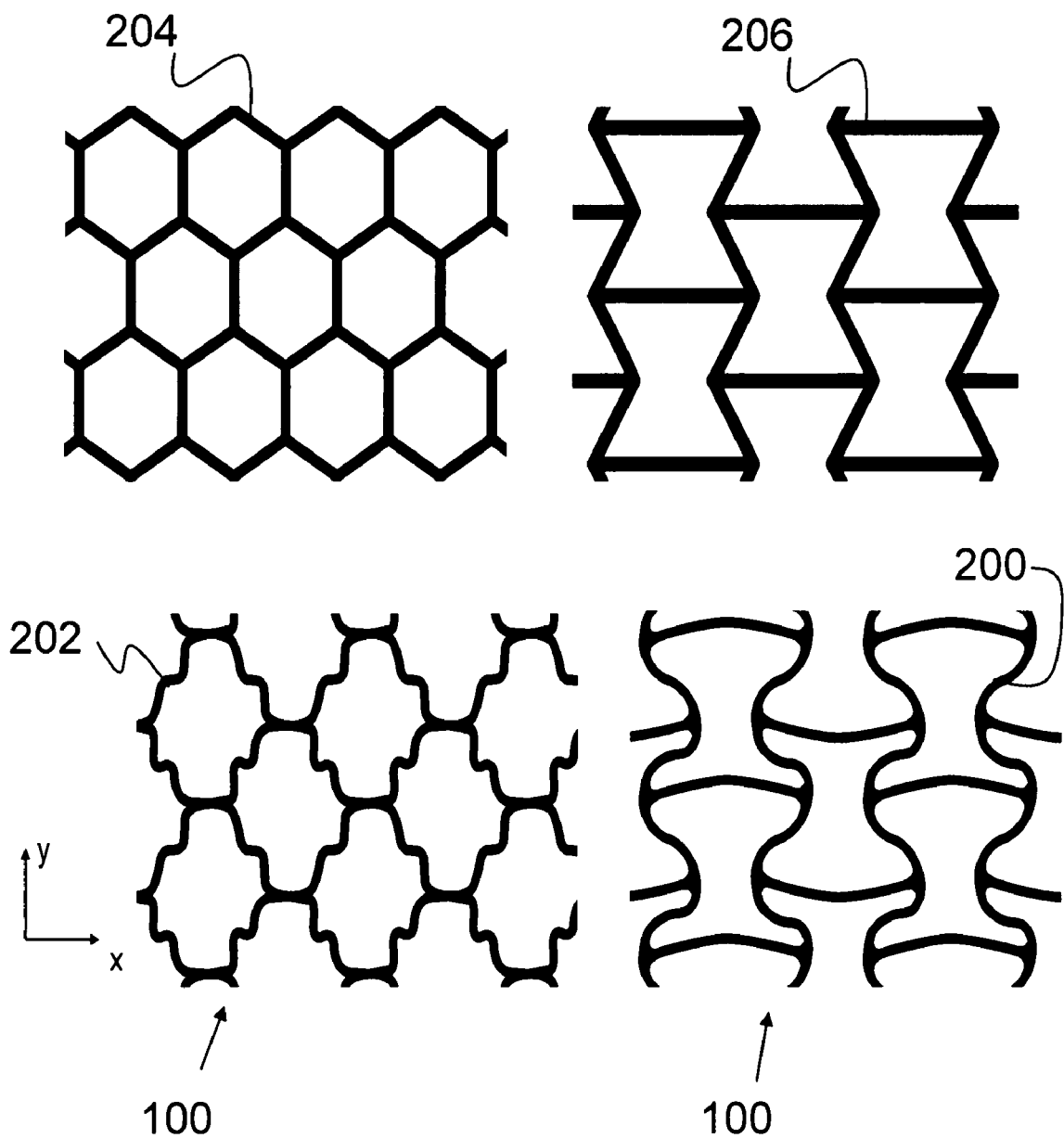
FIG. 2 illustrates a series of different cellular structure geometries with strain relief configurations for use with variable-stiffness cell wall materials.

Additionally, the present invention includes several approaches to achieving improved deformation properties using cell wall materials which permit bending deformation. For example, the present invention can be formed to use of an "auxetic" shape that results in zero or even negative Poisson ratio effects. As shown in FIG. 2, the auxetic materials have been improved by incorporating strain relief into the cell wall, either by using curved members 200 or small "kink" regions 202 in the cell walls. As shown, the curved members 200 result in a cellular structure 100 having a negative Poisson strain relief (this is to be contrasted with the straight arm positive Poisson configuration 204). Alternatively, the kink regions 202 are illustrated as resulting in a cellular structure 100 having a positive Poisson strain relief (which is to be contrasted with the straight arm negative Poisson configuration 206).

Figure 3:
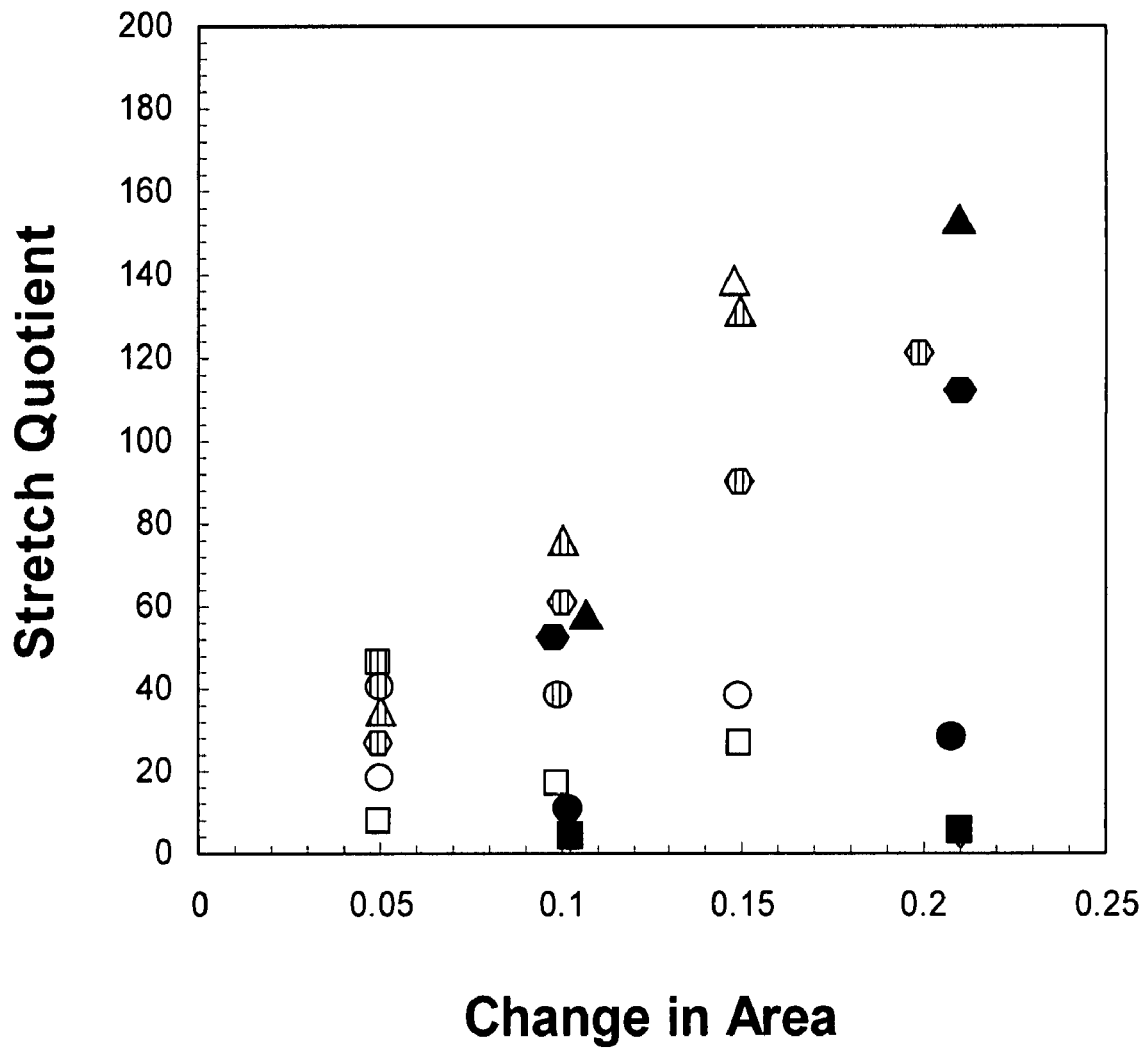
FIG. 3 is a graph illustrating a stretch quotient which quantifies the energy necessary to perform various stretching operations for different cell geometries, where low numbers demonstrate more efficient stretching materials, thus showing the utility of strain relief auxetic materials according to the present invention.

Incorporating a strain relief into the cell wall allows the properties to be more stable over larger strain ranges. These structures have been proven to have desirable properties for large deformation in single and multiple axes. FIG. 3 is a graph illustrating a stretch quotient which quantifies the energy necessary to perform various stretching operations for different cell geometries. The low numbers demonstrate more efficient stretching materials, showing the utility of strain relief auxetic materials. The stretch quotient, which is an important metric to characterize area changing materials, is defined as the amount of work per unit stiffness required to achieve a change in area with a given material. This metric clearly shows the advantages of strain relieved auxetic cell structures to efficiently achieve large deformations.

Figure 4B:
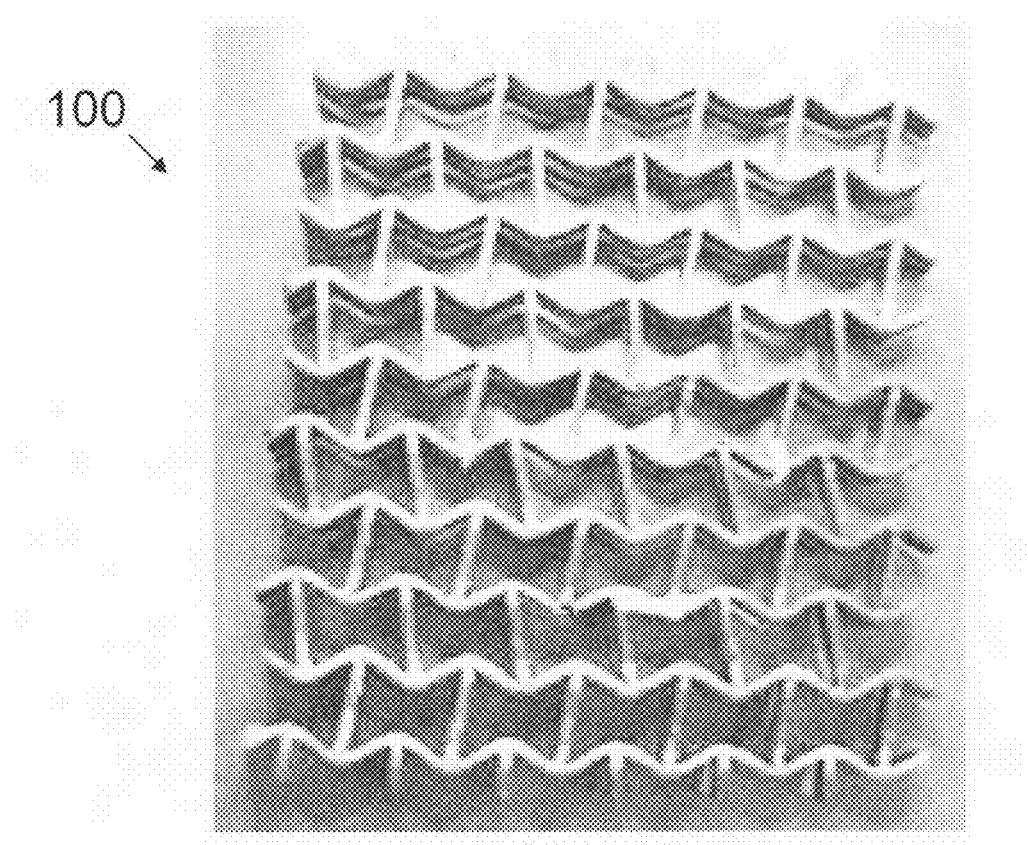
FIG. 4B illustrates a variable configuration cellular material for large deformation according to the present invention.
Figure 4A:
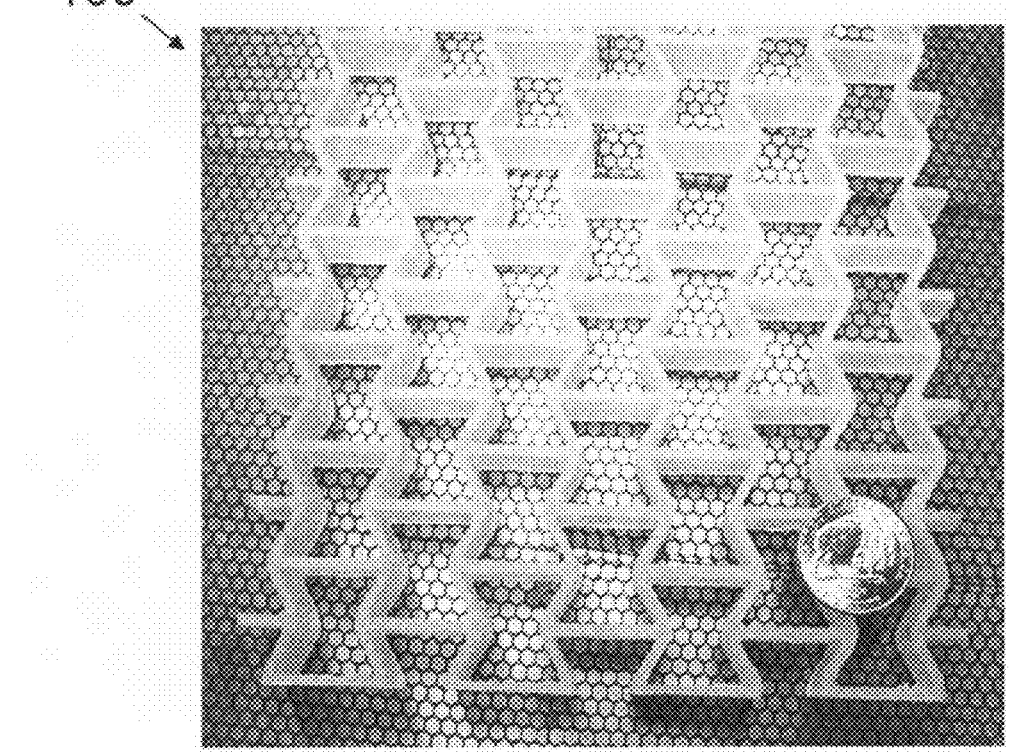
FIG. 4A illustrates a variable configuration cellular material for large deformation according to the present invention.
Figure 5:
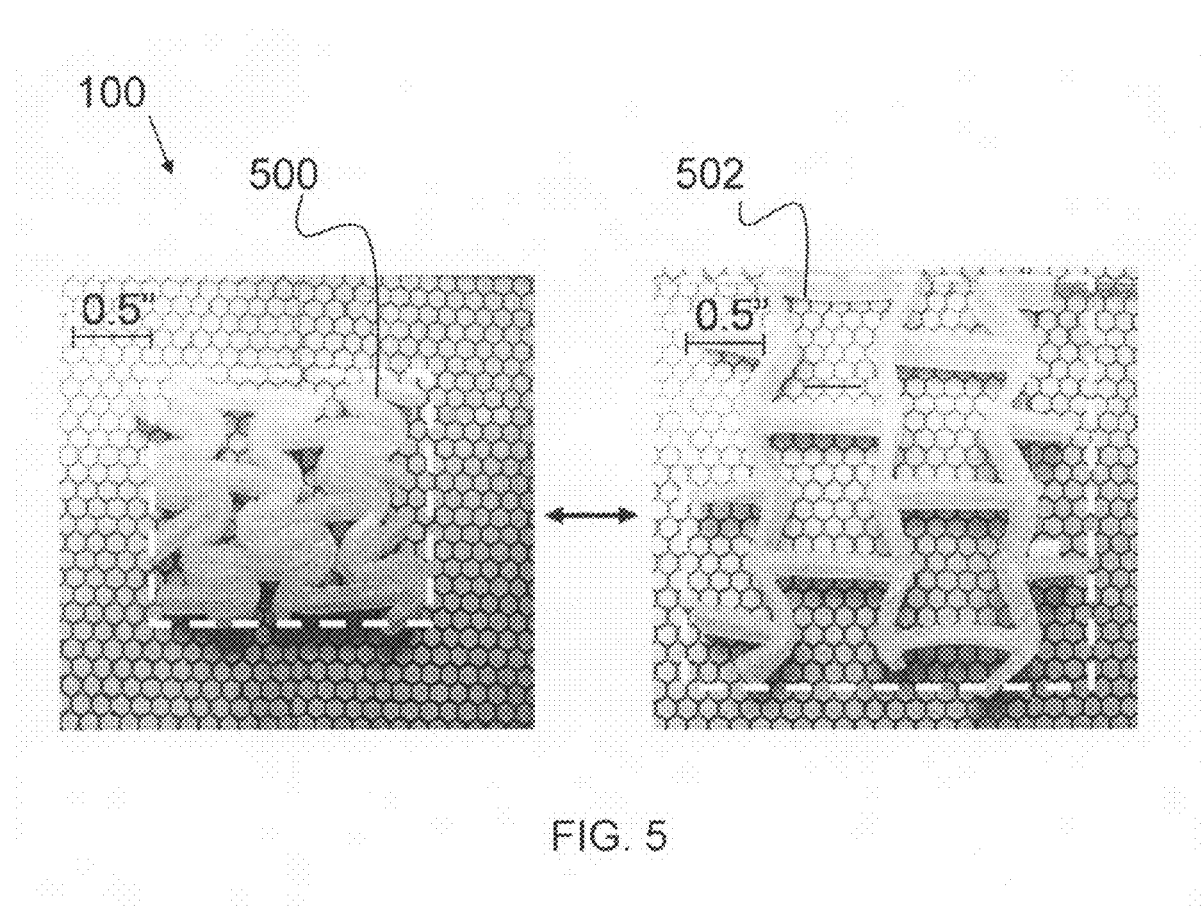
FIG. 5 illustrates an auxetic material effect for accommodation of area change through bending deformation, where both shapes and intermediate positions are stable through variable-stiffness material effects.

FIGS. 4A through 6 illustrate cellular structures 100 produced using shape memory polymer composites which demonstrate the effective concept of the present invention. Each of the cellular structures is stiff in a low energy state (e.g., first stiffness state). Upon excitation with an actuation signal (e.g., thermal energy), the structure becomes compliant (e.g., second stiffness state) and can reversibly accommodate large deformations, such as up to 100%. The structure may be "locked in" at any point by actuating the VSM from the second stiffness state to the first stiffness state (e.g., by reducing the temperature below the SMP transition point). This variable-stiffness aspect makes these materials extremely useful for a reconfiguration application where a structure is transformed to different states to achieve different functions. FIG. 4A illustrates a variable configuration cellular material for large deformation according to the present invention. Additionally, FIG. 4B illustrates another variable configuration cellular material for large deformation according to the present invention. FIG. 5 illustrates an auxetic material effect for accommodation of area change through bending deformation, showing both a contracted state 500 and an expanded state 502. As shown, both shapes and intermediate positions are stable through variable-stiffness material effects.

Figure 6:
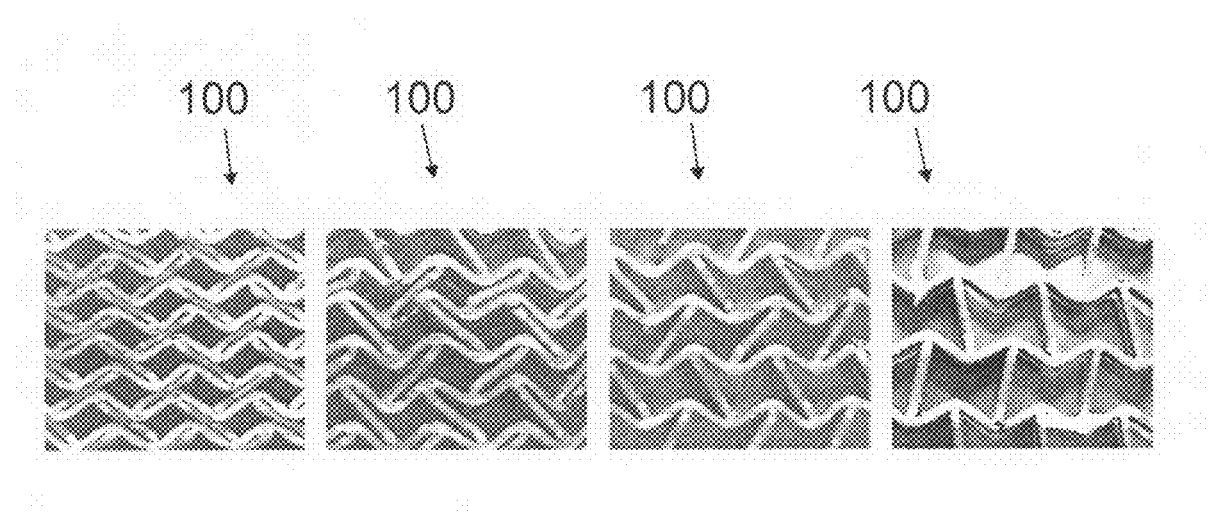
FIG. 6 illustrates a series of photographs demonstrating the accommodation of large external strain through local cell wall bending and hinging, exhibiting an effective zero Poisson ratio.

FIG. 6 is a series of photographs illustrating a cellular structure 100 according to the present invention. The series of photographs demonstrate the accommodation of large external strain through local cell wall bending and hinging, exhibiting an effective zero Poisson ratio.

Figure 7A:
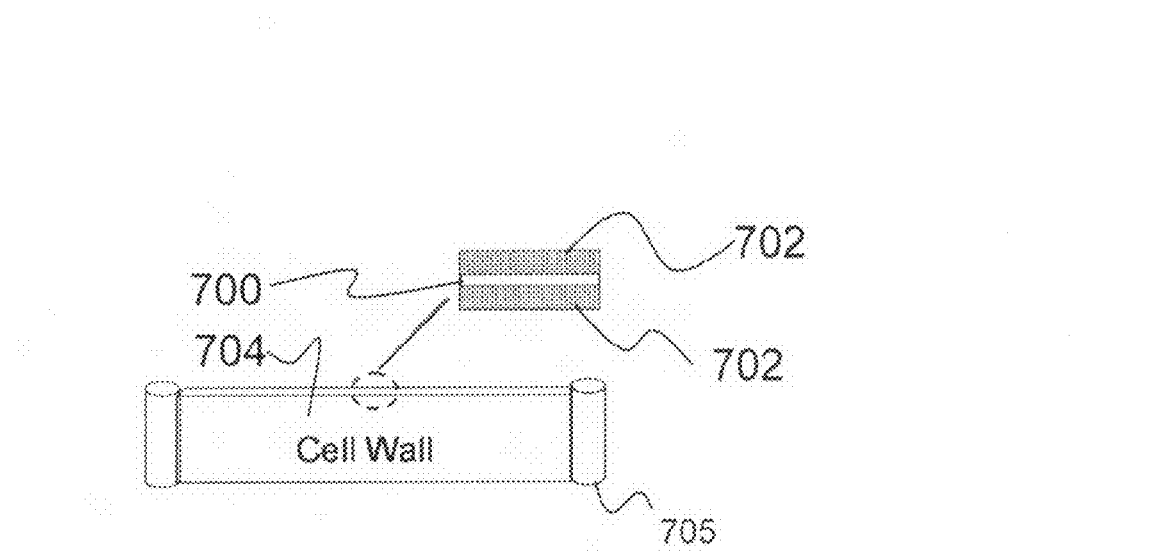
FIG. 7A illustrates functionally graded sidewall materials for cellular structures to enable engineering the in-plane and out-of-plane mechanical properties.
Figure 7B:
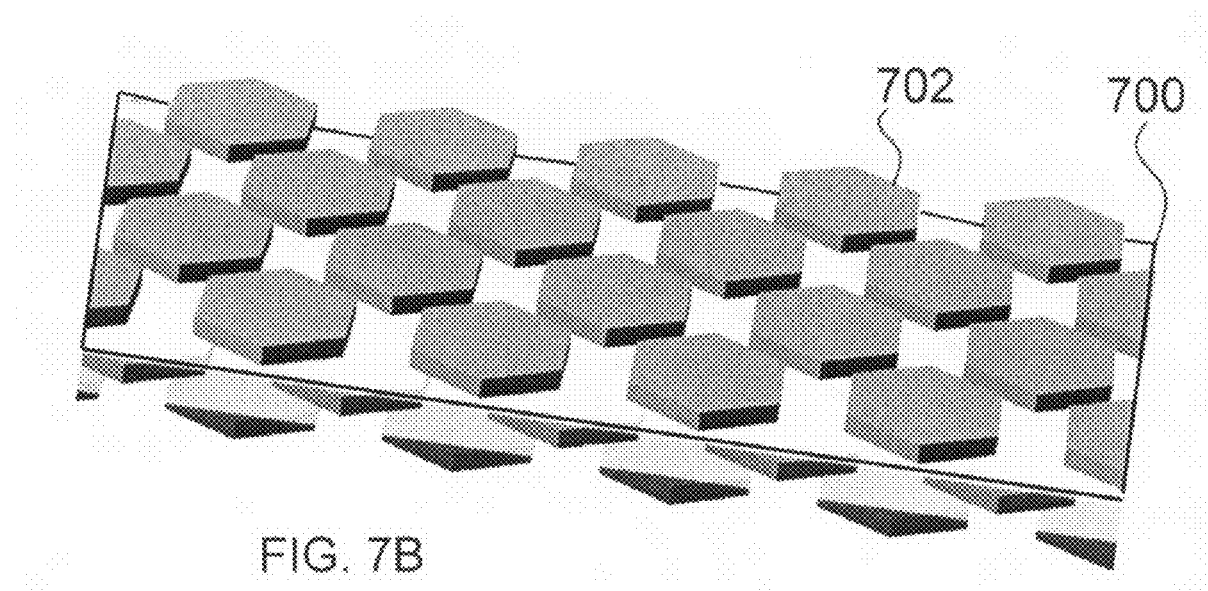
FIG. 7B is an illustration of a constant stiffness core material with a variable-stiffness outer material.

The cellular structure may be further modified by grading the properties of the cell wall through the thickness. The present invention includes a method to increase out-of-plane stiffness resistance while still permitting large deformation in-plane. As shown in FIG. 7A, this method uses a constant stiffness core material 700 (e.g., high strain alloy) with variable-stiffness outer materials 702 for the cell walls 704. Also illustrated is a hinge joint 705 for connecting between adjacent cell walls 704. The hinge joint 705 and its functionality are described in further detail below with respect to FIG. 9. The constant stiffness core material 700 is a material selected to provide structural stiffness to the variable-stiffness cellular structure. FIG. 7B depicts another illustration with a constant stiffness core material 700 with a variable-stiffness outer material 702. By locating the constant stiffness members in the core, bending strains are small. Larger strains can be accommodated in the exterior of the wall in the variable-stiffness material. Non-limiting examples of constant stiffness material include aluminum alloys, steel alloys (such as tempered 1095, or the like), titanium alloys, polymer matrix glass fiber composites, polymer matrix carbon fiber composites, polymer matrix polymer fiber composites (such as KEVLAR®, SPECTRA®, or the like), and structural polymer materials (such as PTO, epoxy, or the like).

Figure 7C:
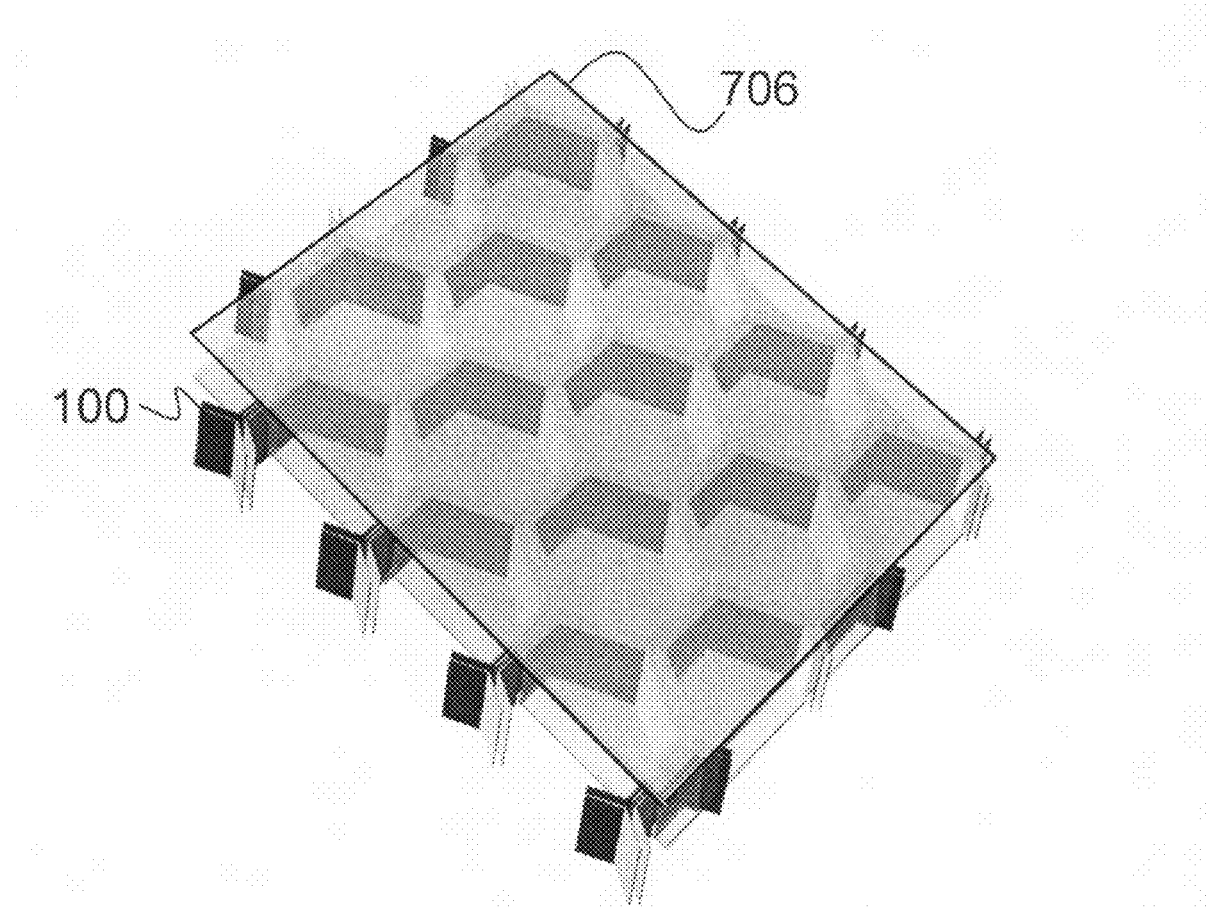
FIG. 7C is an illustration of an outer skin covering material that provides a solid surface to the cellular structure.

In another aspect and as shown in FIG. 7C, an outer skin covering material 706 is used which will provide a solid surface to the cellular structure 100. One example of this covering is an elastic material adhesively bonded to the cell structure. Another example is a high-elongation fabric material, or a thin shape memory polymer. Another role of the outer skin covering is to provide a means of storing elastic energy during transformation so that strain recovery is assisted. The materials can be used for tension so that buckling and wrinkling can be avoided.

Figure 7D:
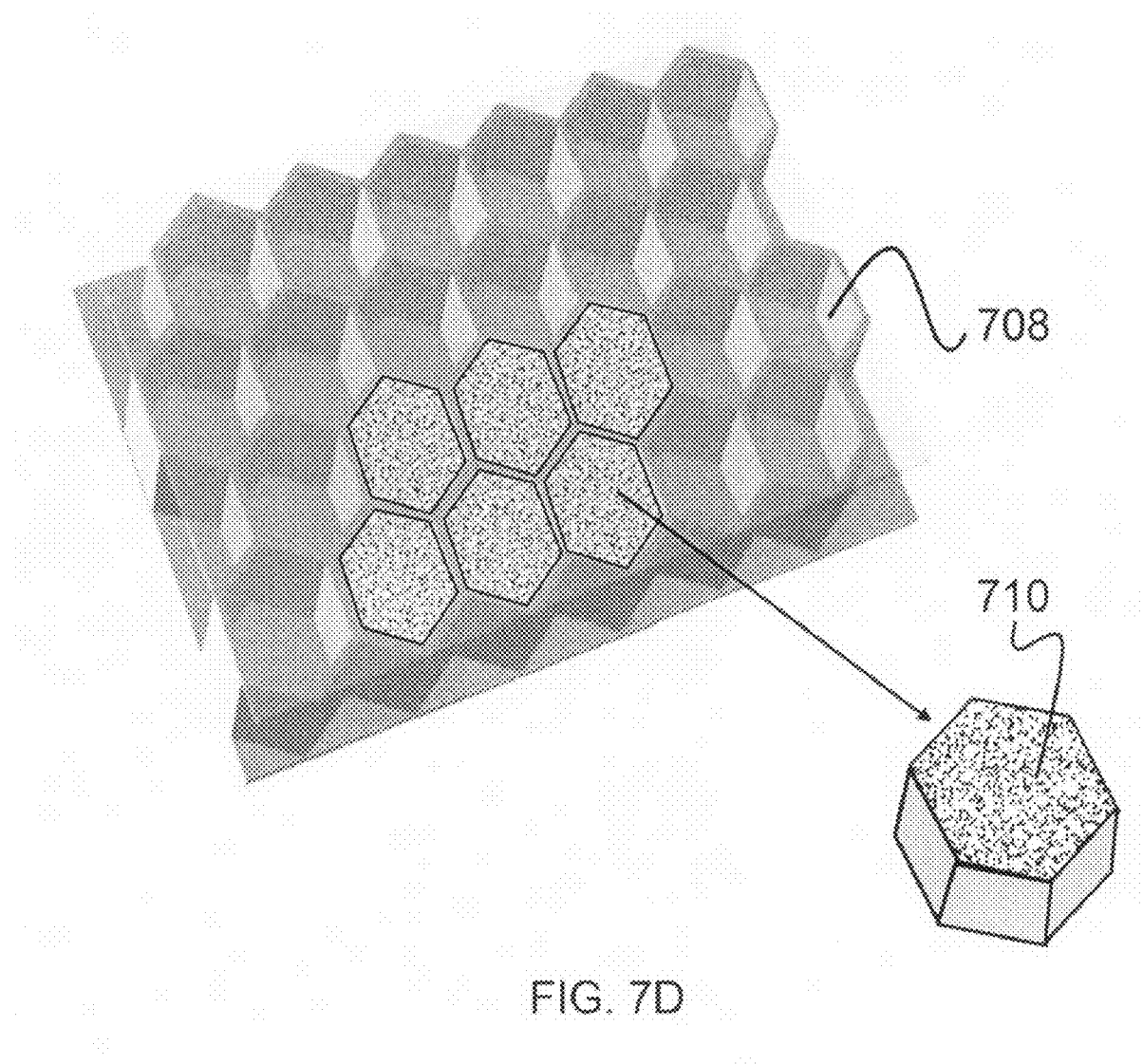
FIG. 7D is an illustration of a cell cavity being filled with a useful material to achieve additional functionality.

As shown in FIG. 7D, another important aspect of the present invention includes filling and using the cell cavities to achieve additional functionality. Thus, the cell cavity 708 is filled with a useful material 710. A couple of approaches are possible. One is to fill the cell cavities with an elastic material, such as an elastic foam, which can deform with the cellular structure and perform the role of sealing the cells and/or storing elastic energy to aid strain recovery. In this application, it is desirable to use a foam with a zero Poisson ratio such that compression or extension of the foam does not result in rippling of the cellular material's surface. Another approach is to reverse the assembly such that the cell walls are made from an elastic material (such as high yield steel or superelastic NiTi) and the cell cavities are filled with a variable-stiffness high-deformation material (such as SMP foam or reinforced SMP foam). By varying the stiffness of the cell cavities, a number of stable configurations have been achieved and large deformation can be accommodated while maintaining relatively stiff effective properties.

In another aspect, deformation of the cellular structure can be achieved using a positive pressure. For example, if individual or multiple cell cavities are pressurized, actuation mechanisms can be created. This mechanism can drive the material to different shape configurations and aid in deployment of reconfigurable structures. Such a system requires an elastic covering to the cellular material which can contain the pressure.

Figures 8, 9A:
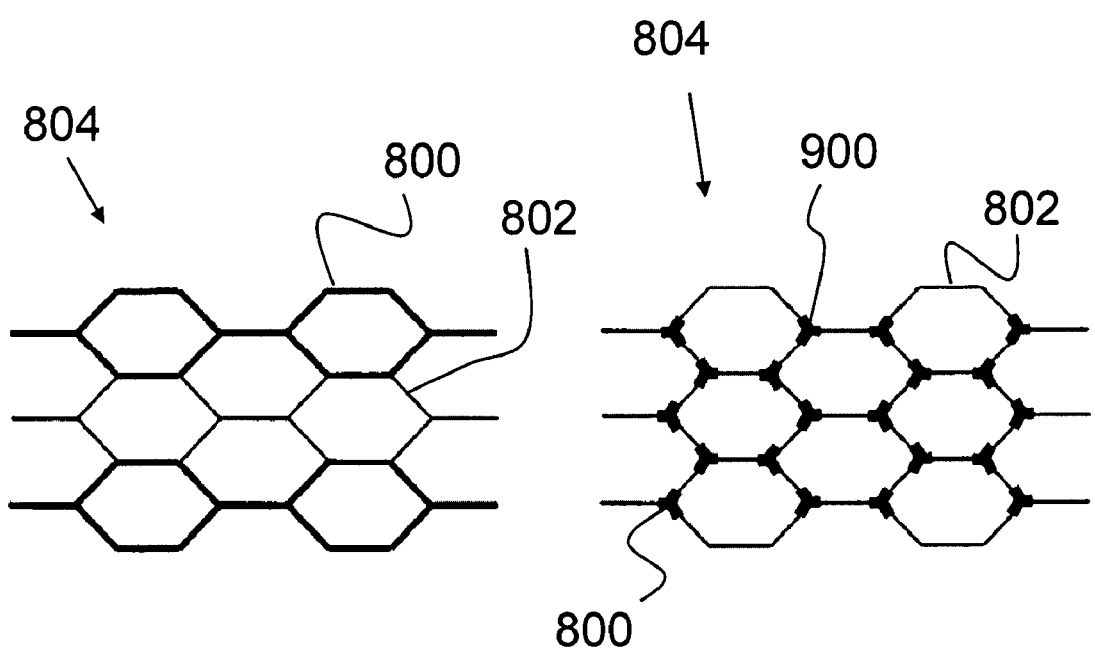
FIG. 8 is an illustration of the cellular structure, where a combination of active materials and a VSM form the cellular structure.
FIG. 9A is an illustration of the cellular structure, where active materials are attached with the cellular structure at a hinge joint.

In yet another aspect and as shown in FIG. 8, a combination of active materials 800 and variable-stiffness materials 802 can also be utilized to tailor the properties of the structure 804. In this aspect, the stiffness of the VSM 802 is decreased below a threshold to allow bending. Once the VSM 802 is bendable, the active material 800 is actuated to cause the VSM 802 to be deformed. When in the desired position, the VSM 802 is actuated to increase its stiffness so that it is in a stiff-state, at which point the active material 800 can be de-actuated. Actuation of the active material 800 and the VSM 802 can be selectively controlled through a different actuation signal, where each is receptive to a different signal (e.g., temperature and electricity).

Another example is illustrated in FIG. 9A, where the active materials 800 are attached with the cellular structure 804 at a hinge joint 900. In this example, when the stiffness of the VSM 802 is below a threshold to allow bending, actuation of the active material 800 forces a bending moment at the hinge joint 900. The hinge joint 900 may selectively control which VSM truss members 802 are permitted to undergo large angular displacements or bending moments. This occurs when portions of the VSM hinge joint selectively undergo a change in stiffness (i.e., softened to low stiffness) providing for tailored levels of local load transmission and deformation accommodation within and between the cellular unit cell. Once deformed to the desired shape, the stiffness of the VSM 802 and variable-stiffness hinge joint 900 can be increased to hold the cellular structure 804 in the desired shape.

Figure 9B:
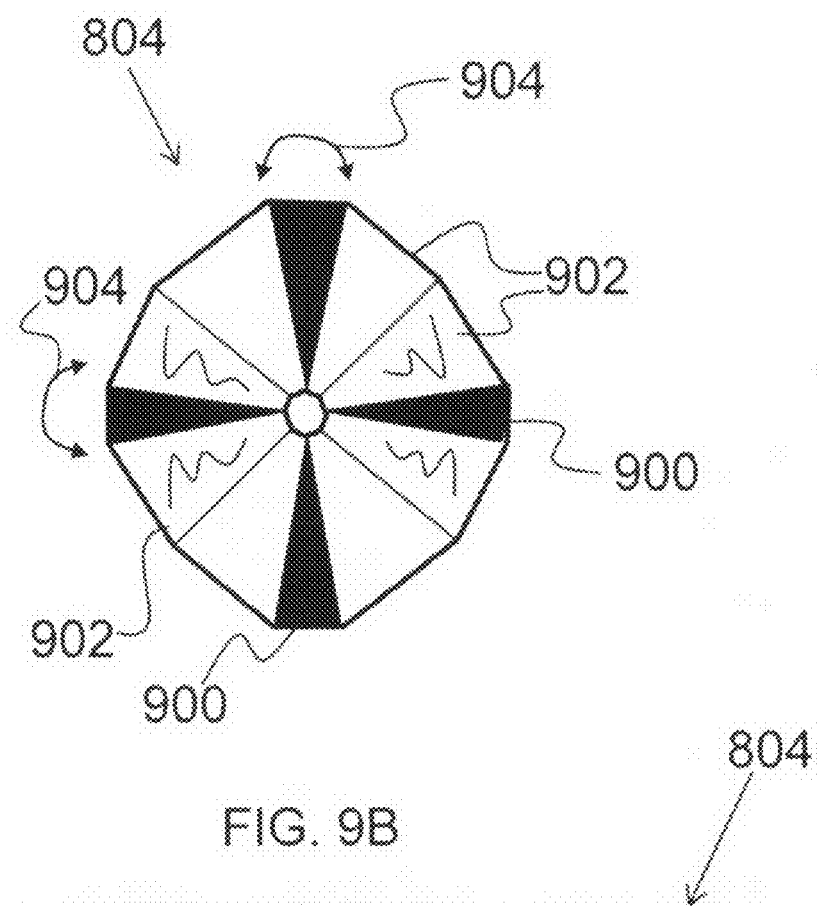
FIG. 9B is a top-view illustration of a cellular structure with rigid cell walls that are connected with each other through a variable-stiffness hinge joint.
Figure 9C:
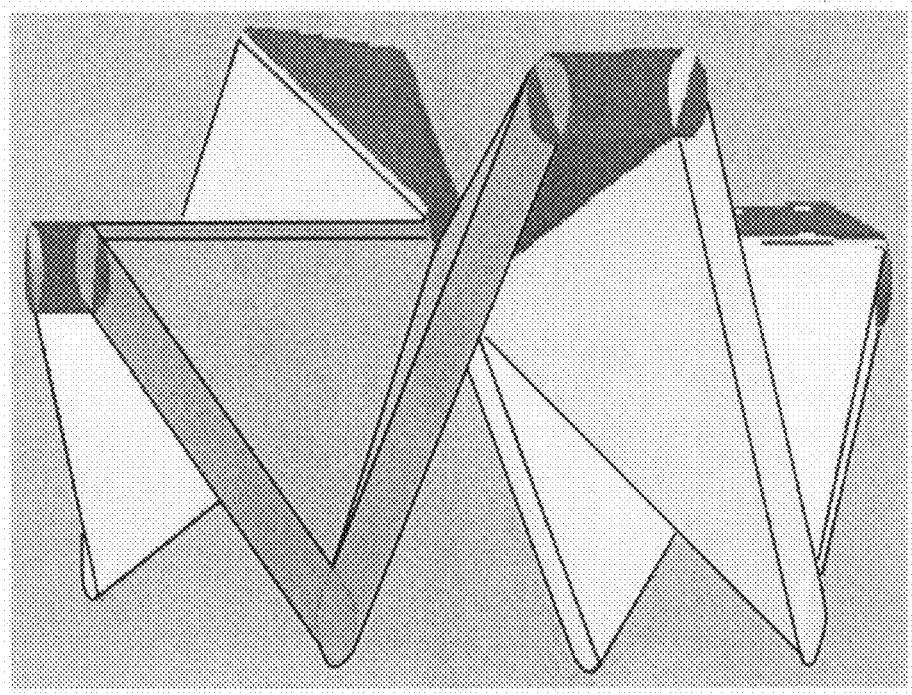
FIG. 9C is a side-view illustration of the cellular structure depicted in FIG. 9B.

FIG. 9B is a top-view illustration of a cellular structure 804 with rigid cell walls 902 that are connected with each other through a variable-stiffness hinge joint 900. As illustrated, the cellular structure 804 illustrated in FIG. 9B has two axes of freedom 904, thereby allowing for a greater deformation. For further illustration, FIG. 9C is a side-view illustration of the cellular structure 804 depicted in FIG. 9B.

Figure 9D:
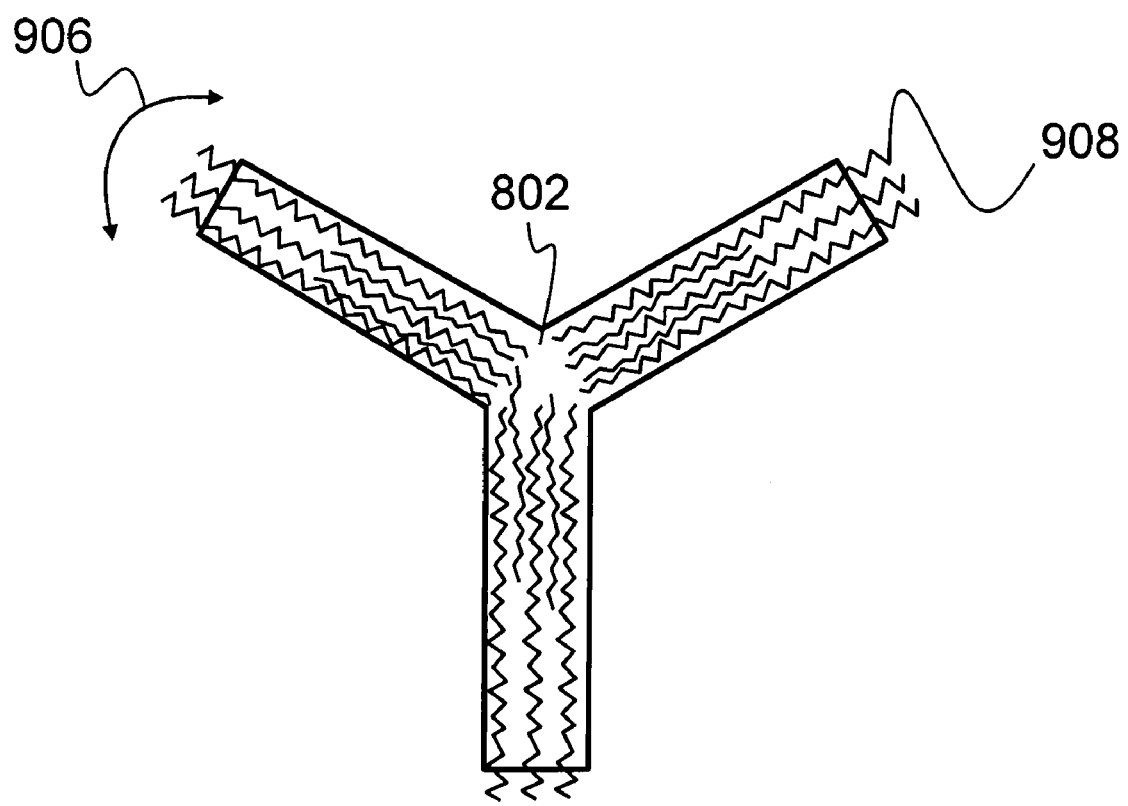
FIG. 9D is an illustration of a cellular structure having a linear elastic material embedded within the VSM to provide one-axis of rotation.

FIG. 9D is another example, where there exists only one-axis of freedom 906. In this example, the VSM 802 is embedded with a linear elastic material 908 to allow for bending along the one-axis of freedom 906.

Figure 10A:
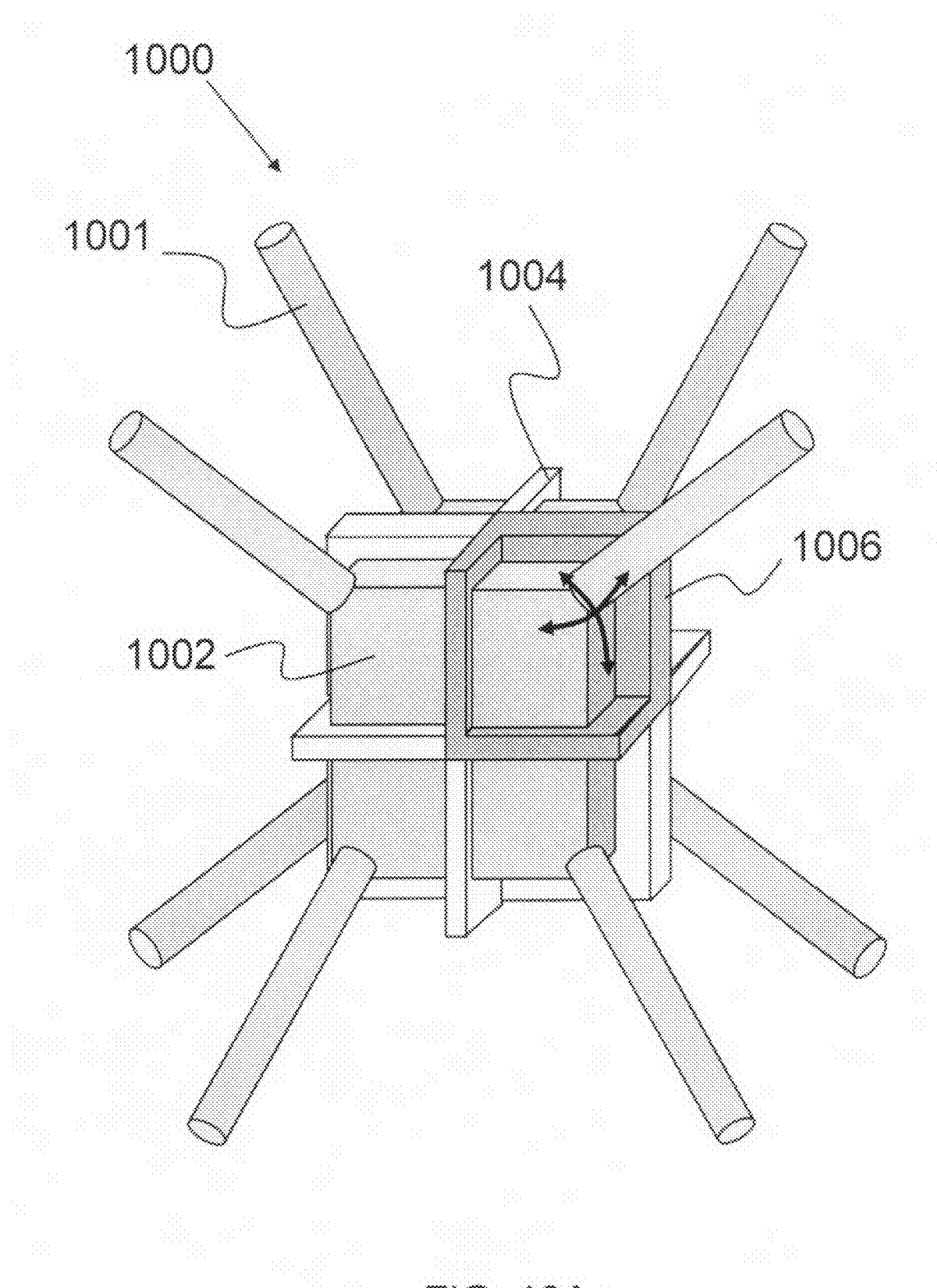
FIG. 10A is an illustration of a cellular structure having three-axes of rotation, with one quadrant being activated.
Figure 10B:
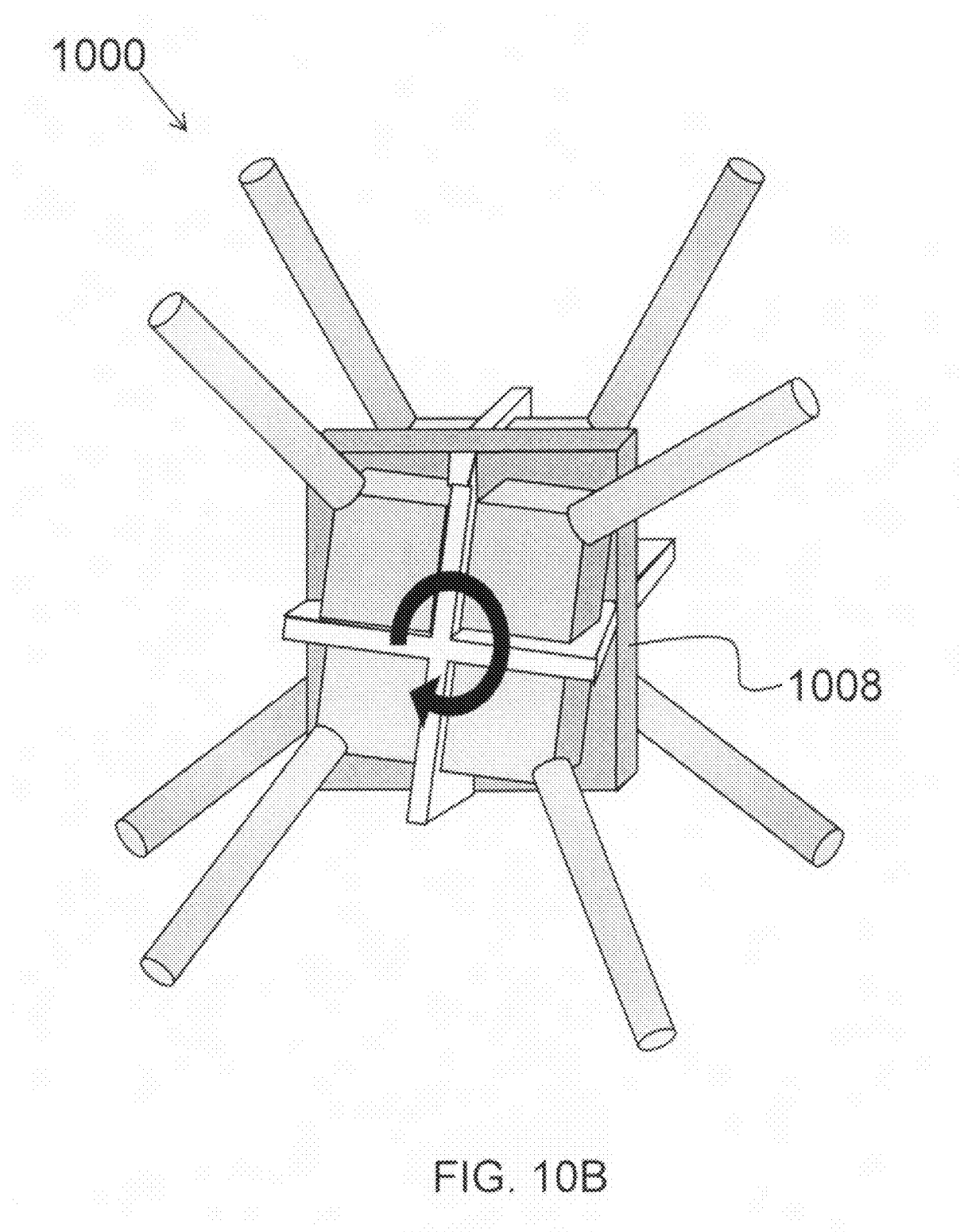
FIG. 10B is an illustration of the cellular structure of FIG. 10A, with a plane being activated.

FIGS. 10A and 10B illustrate yet another example where there are three-axes of rotation (degrees of freedom). As shown in FIG. 10A, the cellular structure 1000 in this configuration includes a structural strut 1001 that is connected with other cells through a strut connector 1002 that is connected with the hinge joint 1004. The hinge joint 1004 in this configuration comprises a bulk piece of stiffness changing material (or a flexural mechanism containing stiffness changing material) that permits locking/unlocking of selective degrees of freedom within one or between multiple cell walls that connect the cellular structure 804. The hinge joint 1004 can include a selectively active (e.g., embedded heaters) VSM. Thus, when a section 1006 (e.g., quadrant) is activated, it provides three degrees of freedom for a single structural strut 1001, but with a limited range of motion. As a non-limiting example, the hinge joint 1004 permits only limited rotation (<360° and typically <30°) perpendicular to one or two desired axes.

FIG. 10B illustrates the structure 1000 of FIG. 10A, with an activated plane 1008 as opposed to the activated section as illustrated in FIG. 10A. As shown, the activated plane 1008 gives one degree of freedom for a hemisphere.

Another technique for deforming the cellular structure from the first shape to the second shape is through an external deformation system. When in a stiffness state that allows for deformation, the external deformation system can be used to physically deform the cellular structure. For example, the external deformation system is a linear or rotary actuator that is capable of applying displacement to the edges or various locations within the cellular structure to change the shape of the cellular structure. Non-limiting examples of such actuators include an electromagnetic motor, a hydraulic cylinder, a pneumatic cylinder, and an ultrasonic piezoelectric motor. A pad can be used to connect the actuator to the cellular structure to distribute force provided by the actuator over a larger area of the cellular structure.

In operation, the variable-stiffness cellular structure can be incorporated into a variety of devices. Non-limiting examples of such applications include morphing skins (such as in aeronautical structures (e.g., wings)), deployable structures (such as large space structures), dynamic stiffness tuning (such as used in robotics), and personalized shape tailoring (such as applicable to body armor).

The specific embodiments described above are not intended to be limiting and are for illustrative purposes only. As can be appreciated by one in the art, the variable-stiffness cellular structure can be incorporated into several embodiments.

What is claimed is:

1. A morphing cellular structure, comprising a group of unit cells with each unit cell having a cellular geometry, the group of unit cells formed of a variable-stiffness material (VSM), where the VSM has a first stiffness state and a second stiffness state, and where the cellular structure has a first shape and a second shape, with a gradation of shapes between the first shape and second shape, and where the transition from the first shape to the second shape occurs through using an actuation signal to actuate the VSM from the first stiffness state to the second stiffness state to change the stiffness of the cellular structure, thereby allowing the cellular structure to be deformed from the first shape to the second shape, and any shape therebetween; and wherein each cell in the cellular structure has a cell wall having a gradation in stiffness property, such that the cell wall has a constant stiffness core inner material that is sandwiched between at least two layers of outer material formed of a variable-stiffness material, where out-of-plane loads are carried by the constant stiffness core inner material.

2. A morphing cellular structure as set forth in claim 1, wherein once in the second shape, the cellular structure can be locked in the second shape through activating the VSM from the second stiffness state to the first stiffness state.

3. A morphing cellular structure as set forth in claim 2, wherein each cell has a plurality of edges, and wherein the cellular structure is deformed from the first shape to the second shape using an external deformation system, the external deformation system being an actuator such that the actuator can be used to apply displacement to the edges of the cellular structure to change the shape of the cellular structure, and wherein the actuator is selected from a group consisting of an electromagnetic motor, a hydraulic cylinder, a pneumatic cylinder, and an ultrasonic piezoelectric motor.

4. A morphing cellular structure as set forth in claim 3, further comprising a pad connected between the actuator and the cellular structure to distribute force provided by the actuator over a larger area of the cellular structure.

5. A morphing cellular structure as set forth in claim 1, wherein the cellular structure is configured to have a ratio selected from a group consisting of a negative Poisson ratio and a positive Poisson ratio.

6. A morphing cellular structure as set forth in claim 1, wherein at least one cell in the cellular structure includes a strain relief, thereby allowing the cell to accommodate global tensile stretching through cell wall bending.

7. A morphing cellular structure as set forth in claim 6, wherein the constant stiffness material is a material selected from a group consisting of steel alloys; aluminum alloys; titanium alloys; glass fiber reinforced polymer; carbon fiber reinforced polymer; polymer fiber reinforced polymer; high stiffness structural polymers; or silicone; a metal; a fiber composite; a polymer; a ceramic; and a semiconductor.

8. A morphing cellular structure as set forth in claim 1, wherein each cell has a cavity and the cavity is filled with a volume changeable elastic material.

9. A morphing cellular structure as set forth in claim 8, wherein the elastic material is elastic foam.

10. A morphing cellular structure as set forth in claim 9, wherein the elastic foam is polymeric foam.

11. A morphing cellular structure as set forth in claim 1, wherein each cell has a wall thickness and the wall thickness is between $1/1000$ and $1/3$ of a cell length.

12. A morphing cellular structure as set forth in claim 1, wherein the morphing cellular structure has a size and each unit cell in the morphing cellular structure is between approximately one thousandths and one third of the size of the morphing cellular structure.

13. A morphing cellular structure as set forth in claim 1, wherein each unit cell includes cell walls and the morphing cellular structure further comprises a hinge joint having a variable-stiffness material that permits locking/unlocking of selective degrees of freedom between multiple cell walls that are in the cellular structure.

14. A morphing cellular structure as set forth in claim 13, wherein the hinge joint is formed to permit a limited rotation to one desired axis.

15. A morphing cellular structure as set forth in claim 13, wherein the hinge joint is formed to permit a limited rotation to two desired axes.

16. A morphing cellular structure as set forth in claim 13, wherein the hinge joint is formed to permit a limited rotation to three desired axes.

17. A morphing cellular structure as set forth in claim 1, wherein the cellular structure has an external surface and further comprising a solid outer skin covering the external surface.

18. A morphing cellular structure as set forth in claim 17, wherein the skin covering is a material selected from a group consisting of an elastic material which is adhesively bonded to the cell structure, a stretchable fabric material, a thin shape memory polymer, and a VSM.

19. A morphing cellular structure as set forth in claim 17, wherein the skin covering stores elastic energy during transformation so that strain and shape recovery is assisted.

20. A morphing cellular structure as set forth in claim 1, wherein the wall thickness is varied to change deformation properties to control the local strain within each wall and the global strain of the whole structure.

21. A morphing cellular structure as set forth in claim 1, wherein the cellular structure is configured to be deformed by softening the VSM, actuating an actuator using an actuator signal to induce deformation, hardening the VSM, and then releasing the actuator signal.

22. A morphing cellular structure as set forth in claim 1, wherein the cellular structure is configured to change from the first shape to the second shape through an actuation process selected from a group consisting of directly applying loads to the VSM of the cell wall, and incorporating an active material into at least one cell in the cellular structure, where the active material is responsive to a second actuation signal such that when the VSM is in the second stiffness state, the second actuation signal can be actuated to cause the VSM to deform from the first shape to the second shape.

23. A morphing cellular structure as set forth in claim 1, wherein there exists 17 planar symmetry groups and each cell has a cellular geometry and the cellular geometry is selected from a group consisting of the 17 planar symmetry groups.

24. A morphing cellular structure as set forth in claim 1, wherein the actuation signal is a signal selected from a group consisting of a temperature change, redox reaction, pH change, electromagnetic field, chemical reaction, electric current, electric field, and magnetic field.

25. A morphing cellular structure as set forth in claim 1, wherein an active material is attached with the VSM at a hinge joint such that actuation of the active material forces a bending moment at the hinge joint.

26. A morphing cellular structure as set forth in claim 1, wherein the VSM is material selected from a group consisting of shape memory polymers; shape memory alloys; phase changing metals; wax; ice; plastically deforming materials; electrorheological fluids; magnetorheological fluids; electrostrictive materials; piezoelectrictrics materials; magnetostrictive materials; ferromagnetic magnetostrictive materials; magnetorheological elastomers; electrorheological elastomers; and liquid crystal elastomers.

27. A morphing cellular structure, comprising a group of unit cells with each unit cell having a cellular geometry, the group of unit cells being formed of a variable-stiffness material (VSM), where the VSM has a first stiffness state and a second stiffness state, and where the cellular structure has a first shape and a second shape, with a gradation of shapes between the first shape and second shape, and where the transition from the first shape to the second shape occurs through using an actuation signal to actuate the VSM from the first stiffness state to the second stiffness state to change the stiffness of the cellular structure, thereby allowing the cellular structure to be deformed from the first shape to the second shape, and any shape therebetween; and wherein the VSM is embedded with a linear elastic material to allow for bending along one-axis of freedom.

28. A method for forming a morphing cellular structure, comprising an act of forming a group of unit cells with each unit cell having a cellular geometry, the group of unit cells formed of a variable-stiffness material (VSM), where the VSM has a first stiffness state and a second stiffness state, and where the cellular structure has a first shape and a second shape, with a gradation of shapes between the first shape and second shape, and where the transition from the first shape to the second shape occurs through using an actuation signal to actuate the VSM from the first stiffness state to the second stiffness state to change the stiffness of the cellular structure, thereby allowing the cellular structure to be deformed from the first shape to the second shape, and any shape therebetween; and wherein each cell in the cellular structure has a cell wall having a gradation in stiffness property, such that the cell wall has a constant stiffness core inner material that is sandwiched between at least two layers of outer material formed of a variable-stiffness material, where out-of-plane loads are carried by the constant stiffness core inner material.

29. A method as set forth in claim 28, further comprising an act of forming the cellular structure such that when in the second shape, the cellular structure can be locked in the second shape through activating the VSM from the second stiffness state to the first stiffness state.

30. A method as set forth in claim 29, further comprising an act of forming the cellular structure such that each cell has a plurality of edges, and wherein the cellular structure is deformed from the first shape to the second shape using an external deformation system, the external deformation system being an actuator such that the actuator can be used to apply displacement to the edges of the cellular structure to change the shape of the cellular structure, and wherein the actuator is selected from a group consisting of an electromagnetic motor, a hydraulic cylinder, a pneumatic cylinder, and an ultrasonic piezoelectric motor.

31. A method as set forth in claim 30, further comprising an act of connecting a pad between the actuator and the cellular structure to distribute force provided by the actuator over a larger area of the cellular structure.

* * * * *